(12) United States Patent
Sapena Soler

(10) Patent No.: US 9,432,328 B2
(45) Date of Patent: Aug. 30, 2016

(54) METHOD FOR THE CERTIFICATION OF ELECTRONIC MAIL DELIVERY

(75) Inventor: Francisco Sapena Soler, Lleida (ES)

(73) Assignee: LLEIDANETWORKS SERVEIS TELEMATICS S.A., Lleida (ES)

( * ) Notice: Subject to any disclaimer, the term of this patent is extended or adjusted under 35 U.S.C. 154(b) by 0 days.

(21) Appl. No.: 13/437,709

(22) Filed: Apr. 2, 2012

(65) Prior Publication Data

US 2013/0218989 A1    Aug. 22, 2013

(30) Foreign Application Priority Data

Feb. 21, 2012  (EP) ..................................... 12382060

(51) Int. Cl.
G06F 15/16   (2006.01)
H04L 12/58   (2006.01)
G06Q 10/10   (2012.01)

(52) U.S. Cl.
CPC ............. *H04L 51/34* (2013.01); *G06Q 10/107* (2013.01); *H04L 51/30* (2013.01)

(58) Field of Classification Search
CPC .............. G06F 15/16; G06Q 20/0855; G06Q 20/3674; G06Q 20/3821; G06Q 20/401
USPC ........................................................ 709/206
See application file for complete search history.

(56) References Cited

U.S. PATENT DOCUMENTS

| | | | | |
|---|---|---|---|---|
| 5,815,555 | A * | 9/1998 | Cairo | 379/93.07 |
| 6,606,744 | B1 * | 8/2003 | Mikurak | 717/174 |
| 7,124,101 | B1 * | 10/2006 | Mikurak | 705/35 |
| 7,822,820 | B2 * | 10/2010 | LeVasseur et al. | 709/206 |
| 8,429,232 | B1 * | 4/2013 | Appenzeller et al. | 709/206 |
| 8,494,485 | B1 * | 7/2013 | Broch | H04L 9/3263 370/329 |
| 8,639,214 | B1 * | 1/2014 | Fujisaki | 455/406 |
| 2001/0027523 | A1 | 10/2001 | Wakino | |
| 2004/0064351 | A1 * | 4/2004 | Mikurak | 705/7 |
| 2004/0177048 | A1 | 9/2004 | Klug | |
| 2005/0015455 | A1 * | 1/2005 | Liu | 709/207 |
| 2005/0131839 | A1 * | 6/2005 | Cordery | G06Q 20/02 705/78 |

(Continued)

FOREIGN PATENT DOCUMENTS

| | | |
|---|---|---|
| JP | 2001060531 | 9/2002 |
| JP | 2002064535 | 9/2003 |
| JP | 2002344525 | 6/2004 |

OTHER PUBLICATIONS

European Search Report issued in EP12382060 on Jun. 6, 2012.

(Continued)

*Primary Examiner* — Kevin Bates
*Assistant Examiner* — Clarence McCray
(74) *Attorney, Agent, or Firm* — Blank Rome LLP

(57) ABSTRACT

The object of the invention is a method to receive and send electronic mail from a transmitting user to a recipient, generating proof of the operation transactions to submit the transmitting user a certificate as a trusted third party. To that end, it features the steps of reception in a mail server of a copy of the first electronic message sent by the transmitting user to the recipient, the later delivery of a copy of the first electronic message to the recipient together with a particular indication, so that the recipient receives a second electronic message copy of the first electronic message from the mail server, which comprises that particular indication. Finally, the data processing unit creates an electronic document with the transactional data of the delivered copy and signs it digitally creating a certificate that is sent to the initial user.

7 Claims, 4 Drawing Sheets

(56) References Cited

U.S. PATENT DOCUMENTS

| | | | |
|---|---|---|---|
| 2006/0072144 A1* | 4/2006 | Dowling et al. | 358/1.15 |
| 2007/0005716 A1* | 1/2007 | LeVasseur et al. | 709/206 |
| 2007/0076880 A1* | 4/2007 | Kresina | 380/255 |
| 2007/0083749 A1* | 4/2007 | Fang | H04L 12/58 713/152 |
| 2007/0113101 A1* | 5/2007 | LeVasseur et al. | 713/189 |
| 2007/0174402 A1* | 7/2007 | Tomkow | 709/206 |
| 2007/0208941 A1* | 9/2007 | Backer | 713/170 |
| 2008/0141026 A1* | 6/2008 | Cordery | H04L 12/585 713/156 |
| 2008/0278740 A1* | 11/2008 | Bird et al. | 358/1.15 |
| 2009/0119512 A1* | 5/2009 | Bullard, Jr. | G06Q 20/02 713/180 |
| 2010/0100465 A1* | 4/2010 | Cooke et al. | 705/34 |
| 2010/0198712 A1* | 8/2010 | Benisti et al. | 705/34 |
| 2010/0223470 A1* | 9/2010 | Lord et al. | 713/175 |
| 2010/0325005 A1* | 12/2010 | Benisti | G06Q 10/107 705/26.1 |
| 2011/0093713 A1* | 4/2011 | Blot-Lefevre | 713/175 |
| 2011/0113109 A1* | 5/2011 | Levasseur et al. | 709/206 |
| 2011/0218916 A1* | 9/2011 | Barber | 705/44 |
| 2011/0246588 A1* | 10/2011 | Tomkow | 709/206 |
| 2012/0011361 A1* | 1/2012 | Guerrero | G06Q 10/107 713/168 |
| 2014/0075185 A1* | 3/2014 | Dragomir | H04L 9/3268 713/156 |
| 2014/0229318 A1* | 8/2014 | Natarajan | 705/26.5 |
| 2015/0222643 A1* | 8/2015 | Sharif | H04L 63/0823 713/155 |

OTHER PUBLICATIONS

Office Action dated Sep. 8, 2015; Japanese Application No. JP2014-555270; 4 pages.

English translation of Office Action dated Sep. 8, 2015; Japanese Application No. JP2014-555270; 6 pages.

English translation; Japanese Application No. JP2001060531; date of publication Sep. 10, 2002; 19 pages.

English translation; Japanese Application No. JP2002064535; date of publication Sep. 25, 2003; 9 pages.

English translation; Japanese Application No. JP2002344525; date of publication Jun. 24, 2004; 13 pages.

\* cited by examiner

METHOD FOR THE CERTIFICATION OF ELECTRONIC MAIL DELIVERY

This application claims the benefit of European Patent Application No. 12382060, filed Feb. 21, 2012, which is hereby incorporated by reference.

OBJECT OF THE INVENTION

The object of the invention is a method so that a telecommunications operator can receive, forward and send electronic mail from a transmitting user to one or several recipients, generating proof of all the transactional operations to, finally, sign it digitally and submit a certificate to the transmitting user as the operator and trusted third party.

BACKGROUND OF THE INVENTION

It is known that, currently, electronic communications have become an essential and indispensable tool for any operation, both legal and illegal. Communications are used for all kinds of transactions, call and message generation, etc., from a source to a destination.

Telecommunications operators are the ones providing the infrastructures that manage, direct and store a large part of this traffic. These telecommunications operators are subjected to regulations, among others, for the use of the radio spectrum, which is limited, or for the use of telephone numbering resources, which are also finite.

Telecommunications operators, in addition, keep records of the transactions performed by users with the objective, among others, of pricing, registration of the numbers associated with them, billing references, as well as the record of any transactional data used in billing the user. These records are preserved for further verification of pricing and/or follow-up of the traffic on the part of the user.

Occasionally, judicial authorities request the telecommunications operators the recorded data of electronic transactions that were carried out, since they consider them trusted third parties for the purpose of providing these data, as well as any data that could help to determine the physical or legal persons that have done the act in question.

However, the search for data requested to the telecommunications operator is usually complicated by the fact that it is performed on records of high volume activity, normally designed for billing more than for the follow-up of data traceability. Therefore, the above mentioned search of the requested data may consume an enormous amount of resources for the telecommunications operator.

Once the data requested by the judicial authorities is located, the operator issues a certificate in which it explicitly states the transactional data requested, the frequency, destinations, as well as any information that was requested by the relevant judicial authority.

Also, there is among users this same need to have the capability of requesting this information to the communications operators in order to know and certify the transaction data itself, e.g. the transmitted data, the date, the receiving data or any other information useful to the user. This need could be motivated by the request from a third party to the user of the previously mentioned transactional data.

Various methods and systems are known in the current state of the art for the verification of transmission as well as of the integrity of the data contained in an electronic mail. These known methods normally provide proofs and contents of delivery and reception of electronic mails based on a technological solution that allows verifying the transmission.

However, the methods known in the current state of the art have the disadvantage that they implement algorithms and verifications that modify the contents of the message and they also require the comparison of the digital signature of the generated document to the digital signature stored in the server. These verifications are electronic and online, which may be a disadvantage for some third parties requesting this service.

To that end, in case a transmitting user wishes to certify an electronic mail message, the message passes through a second route that implies the delivery of the message to the recipient through the server of a certifying entity, instead of the traditional route for delivery to the recipient. However, this presents a disadvantage since the message is manipulated in this delivery through the certifying entity's server so that the message that is finally received by the recipient is not really the original sent by the sender, but the one transformed by the certifying entity.

Besides the above mentioned, the methods known in the current state of the art file a unique cryptographic algorithm associated to each message, i.e., the digital signature. Later, in case the message needs to be verified, the digital signature of a generated document must be compared to the digital signature stored in the server of the certifying entity and, again, a comparison algorithm must be made between the cryptographic algorithm, which is the data generated and stored by the system known in the current state of the art, and the above comparison must be carried out using a comparison algorithm.

As a special case, in which proof of the delivery to the recipient is needed, there is the delivery of the invoices issued by a generating user to be able to show that, subsequently to the reception of the provision of services or products, a receiving user gets the invoice for those services, thus avoiding that the receiving users of a product or service claim non-receipt of the corresponding invoice to avoid or delay payment of the same.

The methods known in the current state of the art for official notification, such as the telegram, office fax or registered letter have several disadvantages such as the non-mechanization of the process, which results in an elevated time consumption as well as a high cost.

The invention object of this application provides a solution to the previously explained disadvantages through a simple certification method that includes transmission data, the transmitted data, the transmitting operator, the destination operator and the final transmission status' data.

DESCRIPTION OF THE INVENTION

According to what was previously explained, the object of the invention is a method so that a telecommunications operator can certify delivery of an electronic mail based on the verification of the transmission and the data it contains.

The method for delivery certification of an electronic mail from a transmitting user to a recipient object of the invention is characterized in that it comprises the following steps that are carried out in a certification system of the delivery of electronic mail which comprises at least one mail server and a data processing unit that are interconnected:

reception in the mail server of a copy of a first electronic message sent from the transmitting user to the recipient, i.e., the certification system does not receive the original electronic message sent by the transmitting user, but a copy of it, while the original electronic message is sent via the traditional route from the transmitting user to the recipient;

delivery of the copy of the first electronic message to the recipient together with a particular indication, so that the recipient receives a second electronic message copy of the first electronic message from the mail server which comprises the particular indication, therefore the recipient receives both electronic messages;

reception in the mail server of the notification data relative to the delivery to the recipient of the copy of the delivered electronic message;

creation at the data processing unit of an electronic document comprising at least the transmitting user's data, the date of issuance, the contents of the attached data and notification data regarding the delivery of the copy of the electronic message sent;

application at the data processing unit of a digital signature algorithm to the electronic document for the creation of a certificate;

delivery of the certificate to the transmitting user through the mail server.

According to the above mentioned, the method object of the invention has the advantage that it does not modify the contents of the electronic message received by the recipient, and also, it does not generate any algorithm for digital signature comparison, being therefore a method that, in the first place, is simpler than those known in the current state of the art and also it doesn't perform any modification on the electronic message received by the recipient, but the recipient receives a second message which is the one going through the certifying entity's route, i.e., through the certification system's route.

DESCRIPTION OF THE DRAWINGS

To complement the description being made and in order to help better understand the features of the invention, according to a preferred embodiment thereof, a set of drawings is attached as an integral part of said description, wherein the following is shown as way of illustration but not limited to.

PREFERRED EMBODIMENT OF THE INVENTION

Figure 1:
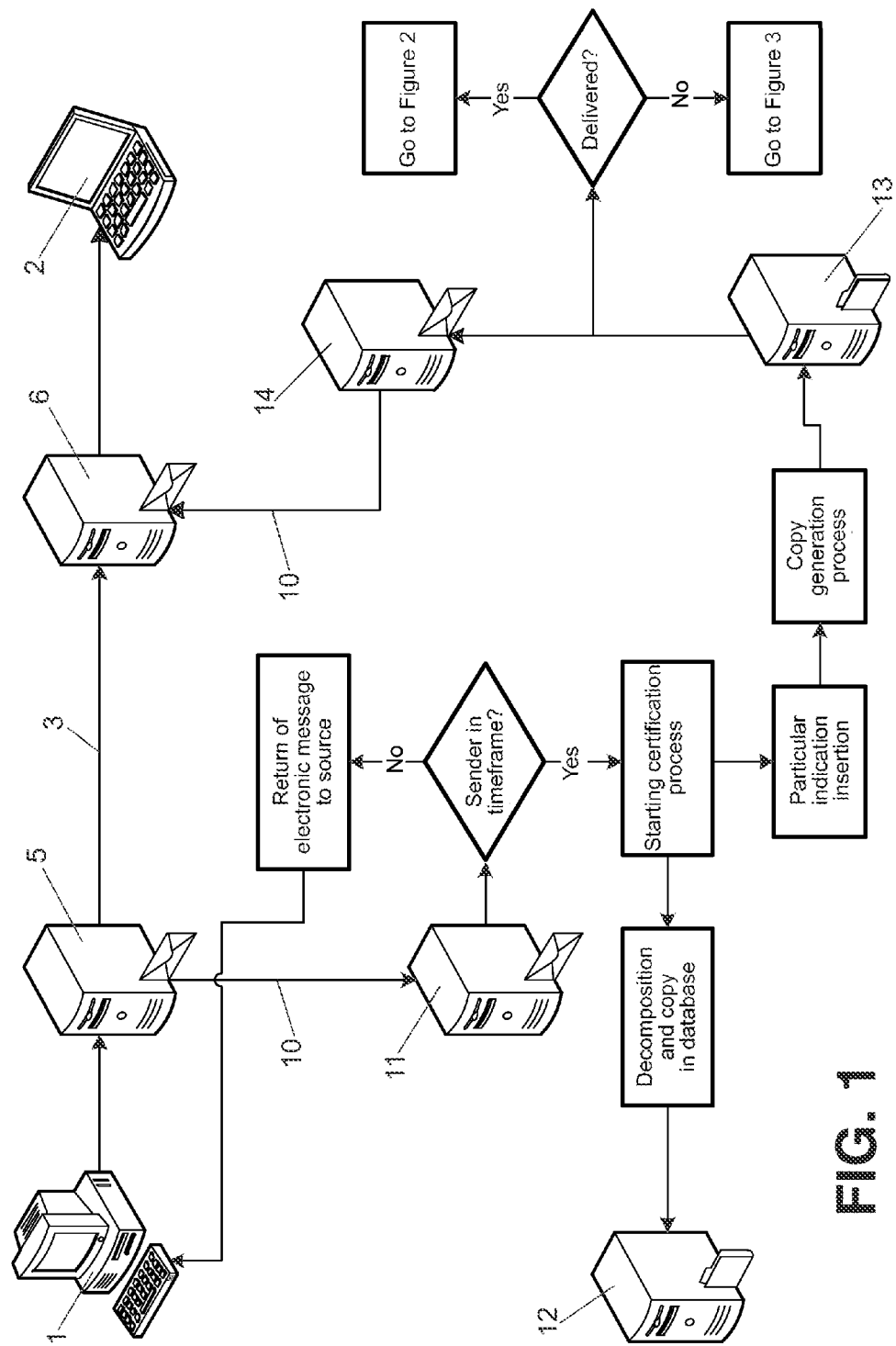
FIG. 1.—Shows a flow diagram of a preferred embodiment of the method object of this invention.

FIG. 1 shows a preferred embodiment of the electronic mail certification method object of the invention, which comprises the delivery of an electronic message from a transmitting user (1) to a recipient (2).

The transmitting user (1), which is a client of the certifying entity, sends the electronic message he/she whishes to certify to the destination electronic address, i.e., to the recipient (2) through an initial route (3) which is the conventional route for the delivery of electronic messages, and also sends a copy to the certifying entity, i.e. through a second route (10) different from the first route (3) in which an incoming mail server (11) receives the aforementioned copy. In the preferred embodiment being shown, the data processing unit (11) that manages the certification process coincides with the incoming mail server (11).

Therefore, the transmitting user (1) uses their usual electronic mail provider, delivering the electronic message to the recipient or recipients (2). To that end, an initial mail server (5) will send a copy of the electronic messages to each of the destination addresses specified by the transmitting user (1) and a destination mail server (6) collects the electronic message so that the recipient (2) is finally able to read it, with this electronic message not suffering any manipulation by the certifying entity or the certifying system.

Additionally, the method may comprise the step of storing a copy of the electronic message in a database (12) or even the processing unit (11) can previously decompose the copy of the electronic message in the different objects that make it up: origin, destination(s), attached files, classification of the attached files and finally the numbering of all the objects with their assignation to the transmitting user (1).

As a preferred embodiment of the attached files, these may constitute an invoice, in this case wishing to certify that the invoice has been delivered to its recipient (2).

Once all its parts are decomposed, indexed and classified, the copy of the electronic message is sent inserting a particular indication, which may be to include the following text in the electronic message: CERTIFIED ELECTRONIC MAIL or even more specifically CERTIFIED INVOICE, if certification is desired for the contents of an invoice included in the attached data. Later, a new copy is made in a second database (13) and it is sent to the certification system's outgoing mail server (14). The outgoing mail server (14) will deliver it to the destination server (6) where it will be available for the recipient (2).

Therefore, the recipient (2) receives two electronic messages. One is the original from the transmitting user (1) which uses his/her own servers (5, 6), therefore, through an initial route (3), and the one that is re-sent by the certifying entity's certification system through a second route (10) with the particular certification indication, e.g., CERTIFIED ELECTRONIC MAIL or CERTIFIED INVOICE.

Figure 2:
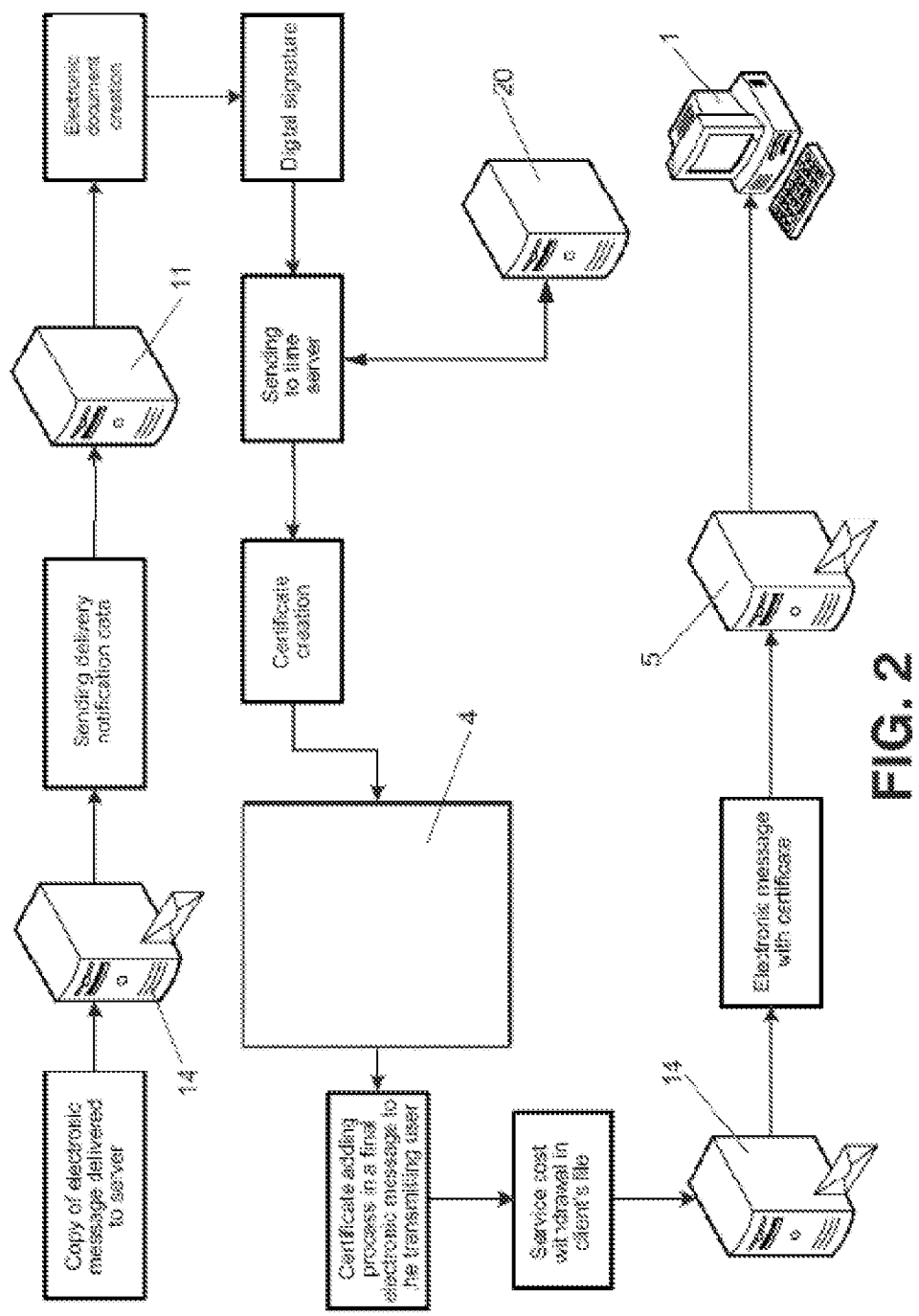
FIG. 2.—Shows a flow diagram of a preferred embodiment of the creation of a digital certificate.

If the copy of the electronic message had a correct electronic mail address and was able to be delivered to the server (6) it continues the certification process, whose preferred embodiment is shown in FIG. 2. In case it was unable to be delivered or the address did not exist, the certification process continues according to the preferred embodiment included in FIG. 3.

Once the copy of the electronic message has been delivered to the server (6) the outgoing mail server (14) receives the notification data relative to the delivery to the transmission of the electronic message copy and sends it to the processing unit (11) which manages the certification process.

Once the delivery directions, steps, incidences or any information that may be useful for the certification process have been received, the processing unit (11) creates, in the preferred embodiment shown in FIG. 2, an electronic document in, for example, a PDF format which includes the transmitting user's (1) data, date of issuance, contents, attached files if any, and finally the date and time of delivery of the electronic message copy.

Once the electronic document has been created, it is digitally signed through a digital signature algorithm for the creation of a certificate (4).

In addition, a digital sum of all the previous contents may be done, i.e., of the electronic document and the digital signature, and it is sent to a trusted timestamping (20) in order to obtain an electronic document with two electronic signatures from two companies in order to provide the certificate (4) itself with greater legal reinforcement.

Once the final file or certificate (4) is available, it is sent to the transmitting user (1) first withdrawing the cost from their credit account and is then delivered to the outgoing mail server (14). This server (14) sends an electronic mail to the transmitting user (1) including the certificate (4).

Figure 3:
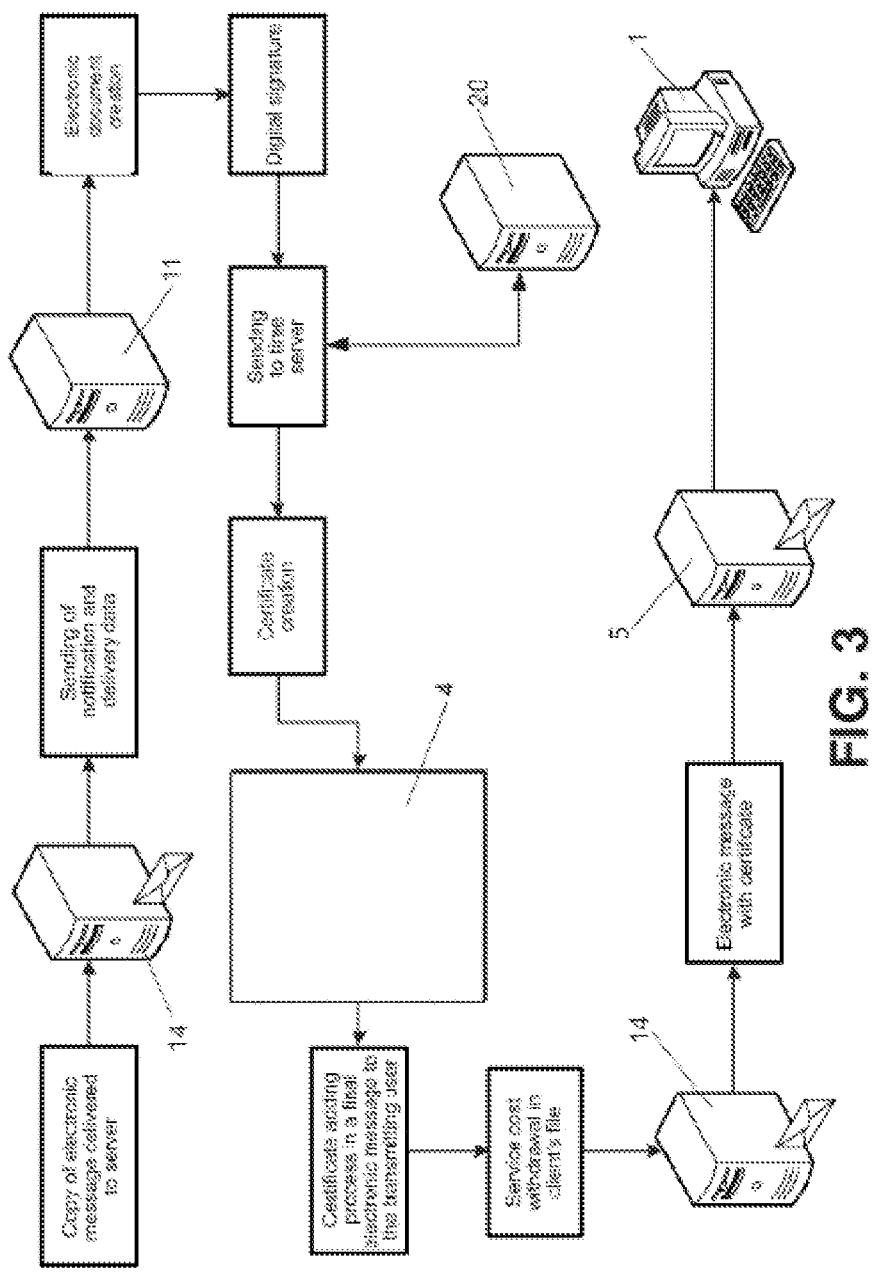
FIG. 3.—Shows a flow diagram of a preferred embodiment of the method in case the copy of the electronic mail may not be delivered to the recipient.

FIG. 3 shows a preferred embodiment of a flow chart in which the copy of the electronic message may not be delivered to the recipient (2). If the electronic message can not be delivered, either because the recipient (2) does not exist, or because the domain is inoperative, it is attempted again during a period of for example 24 hours.

If it is finally able to be delivered, it continues the process according to what was previously explained, but if it can not be delivered, the outgoing mail server (14) of the certifying entity's certification system receives the data from the transactions made, which are sent to the processing unit (11).

Once the delivery indications, the steps, the incidences and any information that might be useful to the certification process are received, the processing unit (11) creates, in the preferred embodiment shown in FIG. 3, an electronic document in, for example, a PDF format including the transmitting user's (1) data, the date of transmission, the contents, the attached files if any and finally the time and date of the delivery attempt of the copy of the electronic message.

Once this electronic document has been created, it is signed digitally through a digital signature algorithm, creating a certificate (4).

In addition, a digital sum of all the previous contents may be done, i.e., of the electronic document and the digital signature, and it is sent to a trusted timestamping (20) in order to obtain an electronic document with two electronic signatures from two entities in order to provide the certificate (4) itself with greater legal reinforcement.

Once the final file or certificate (4) is available, it is sent to the transmitting user (1) first withdrawing the cost from their credit account and is then delivered to the outgoing mail server (14). This server (14) sends an electronic mail to the transmitting user (1) including the certificate (4).

Figure 4:
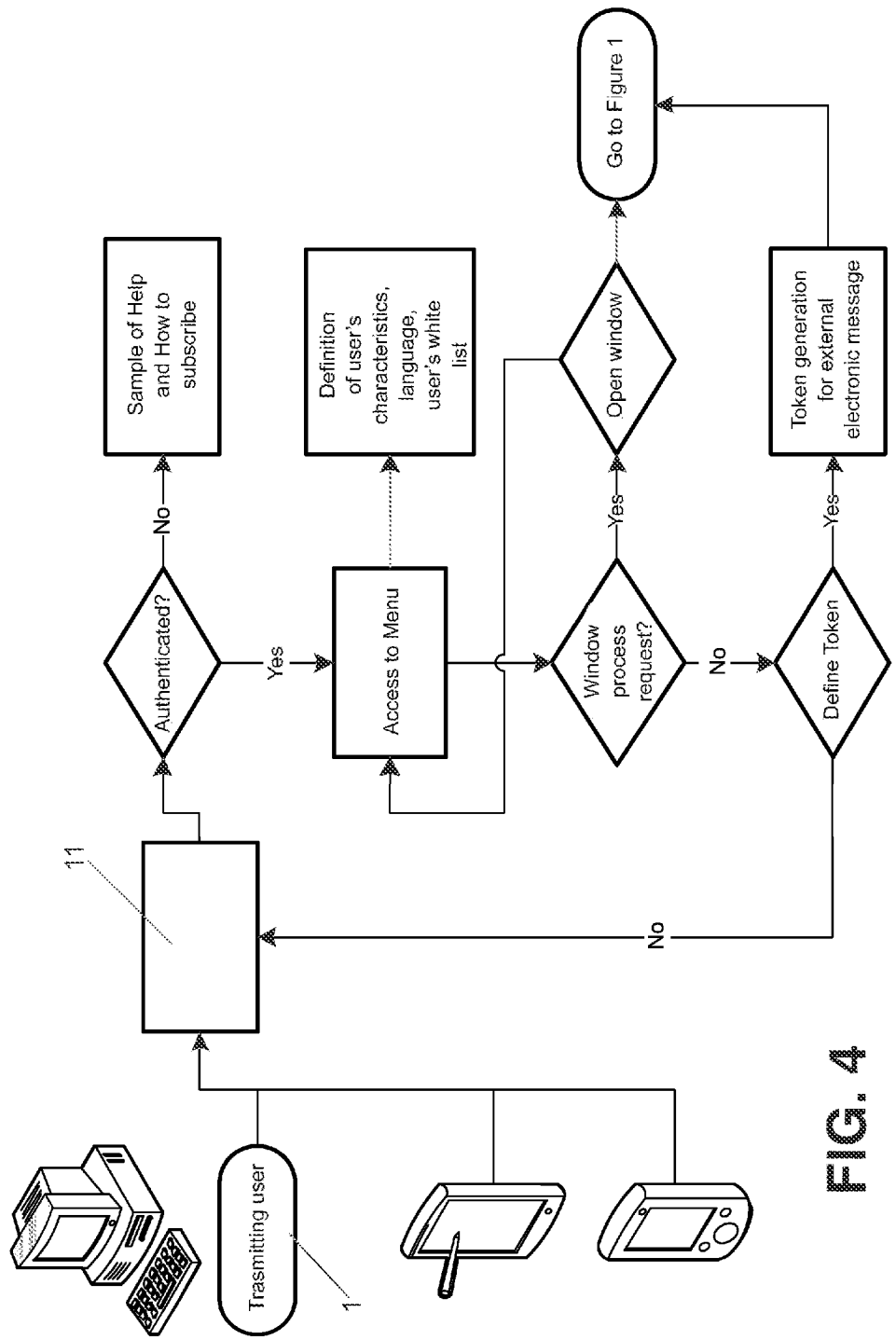
FIG. 4.—Shows a flow diagram of a preferred embodiment of the authentication method of the transmitting user.

FIG. 4 shows a preferred embodiment of the previous step in which the transmitting user (1) initiates the connection with the certifying entity's processing unit (11).

This transmitting user (1) may enter with different access systems, e.g., a personal computer, a tablet, a Smartphone or any device allowing navigation through the Internet.

In the preferred embodiment shown, the transmitting users (1) access a web control access system. This system has access to a database where the transmitting users' (1) information files are located with the certification capacity and the number of certifications they have available, as well as their operational capacity.

The transmitting user (1) enters his/her user name and password, if it is not correct, he/she gets redirected to a system help with an explanation on how to sign up, and reentry into the authentication system.

If the user is correctly authenticated, he/she may access a menu where, the characteristics regarding how the certificate (4) to be issued must be made and from which addresses the certification of electronic messages is allowed, can be specified. Once these parameters have been defined, the transmitting user (1) may request a certification processing timeframe and adjust its schedule. In other words, from a specific moment it authorizes the certification system to let electronic messages in and begin the certification process.

Finally, if when the process is initiated, the transmitting user (1) is in the delivery timeframe for the mail to be certified, it will begin the processes. Otherwise, the mail is returned indicating that it is outside the timeframe or that it is an unknown transmitting user (1).

As an alternative, the user may otherwise request a witness or encrypted token to carry out certification requests without the need to open a window via the Web.

The invention claimed is:

1. A method for certification of electronic mail delivery comprising steps of:
receiving, in a mail server, a first electronic message sent from a transmitting user to a recipient, wherein the transmitting user is a client of a telecommunications operator;
delivering the first electronic message to the recipient via a first route comprising the mail server;
creating a copy of the first electronic message;
delivering the copy of the first electronic message together with a particular indication to the recipient via a second route comprising at least one mail server of the telecommunications operator;
receiving, in a data processing unit of the telecommunications operator, notification data relative to the delivery to the recipient of the copy of the first electronic message;
creating, in the data processing unit of the telecommunications operator, an electronic document comprising data of the transmitting user, date of issuance, contents of attached data, and the notification data;
applying, at the data processing unit of the telecommunications operator, a first digital signature algorithm to the electronic document to create an electronic certificate;
sending the electronic certificate to a third party to carry out a second digital signature; and
delivering the electronic certificate to the transmitting user through the mail server.

2. The method for certification of electronic mail delivery of claim 1 further comprising a step of storing, in a database, the copy of the first electronic message.

3. The method for certification of electronic mail delivery of claim 1, further comprising a step of:
before the step of storing, performing a decomposition of the copy of the first electronic message in at least: origin, destination, attachments.

4. The method for certification of electronic mail delivery of claim 3 further comprising a step of numbering all elements in which the copy of the first electronic mail is decomposed and assigning them to the transmitting user.

5. The method for certification electronic mail delivery of claim 1, further comprising a step of withdrawing credit from an account of the transmitting user by the data processing unit.

6. The method for certification of electronic mail delivery of claim 1, further comprising an initial step of authenticating the transmitting user.

7. The method for certification of electronic mail delivery of claim 1, wherein the copy of the first electronic message comprises attached data which comprise an invoice and the particular indication inserted comprises a sentence reading: CERTIFIED INVOICE.

* * * * *